(12) United States Patent
Fitzi

(10) Patent No.: US 8,035,997 B2
(45) Date of Patent: Oct. 11, 2011

(54) CONTROL ARRANGEMENT AND CIRCUIT ARRANGEMENT FOR CONVERTING A DC VOLTAGE INTO A RECTIFIED VOLTAGE

(75) Inventor: Andreas Fitzi, Staefa (CH)

(73) Assignee: Austriamicrosystems AG, Unterpremstätten (AT)

( * ) Notice: Subject to any disclaimer, the term of this patent is extended or adjusted under 35 U.S.C. 154(b) by 358 days.

(21) Appl. No.: 11/993,291

(22) PCT Filed: Jun. 19, 2006

(86) PCT No.: PCT/EP2006/005871
§ 371 (c)(1),
(2), (4) Date: Apr. 15, 2009

(87) PCT Pub. No.: WO2006/136358
PCT Pub. Date: Dec. 28, 2006

(65) Prior Publication Data
US 2010/0033994 A1    Feb. 11, 2010

(30) Foreign Application Priority Data

Jun. 20, 2005  (DE) .................. 10 2005 028 402

(51) Int. Cl.
*H02M 3/335* (2006.01)
(52) U.S. Cl. ....... 363/18; 363/20; 363/21.11; 363/21.02
(58) Field of Classification Search .............. 363/18, 363/19, 20, 21.01, 21.04, 21.1, 21.11, 56.09
See application file for complete search history.

(56) References Cited

U.S. PATENT DOCUMENTS

| 4,888,821 | A | 12/1989 | Hamp, III et al. |
| 5,488,552 | A | 1/1996 | Sakamoto et al. |
| 5,754,414 | A * | 5/1998 | Hanington ................ 363/21.12 |
| 6,115,266 | A * | 9/2000 | Matsui et al. ............. 363/21.13 |
| 6,256,210 | B1 * | 7/2001 | Strijker et al. ............ 363/21.04 |
| 6,771,059 | B1 * | 8/2004 | Zwicker ....................... 324/119 |

(Continued)

FOREIGN PATENT DOCUMENTS
EP       0 483 432        5/1992
(Continued)

OTHER PUBLICATIONS

English translation of International Preliminary Examination Report for PCT/EP2006/005871.

(Continued)

*Primary Examiner* — Adolf Berhane
*Assistant Examiner* — Nguyen Tran
(74) *Attorney, Agent, or Firm* — Fish & Richardson P.C.

(57) ABSTRACT

Circuitry includes an acquiring circuit to acquire period and phase information of an oscillation. The acquiring circuit includes a first input electrically coupled to a first connection and a second input electrically coupled to a second connection. The first connection and the second connection are for electrically coupling to an oscillating circuit. A control circuit includes a first input electrically coupled to an output of the acquiring circuit. The control circuit includes a second input electrically coupled to a third connection for supply of a voltage that is based on the rectified voltage. A switch includes a controlled segment for electrically coupling a fourth connection to a reference potential connection, and a control connection that is electrically coupled to an output of the control circuit to excite an oscillation in the oscillating circuit via a DC voltage.

19 Claims, 2 Drawing Sheets

U.S. PATENT DOCUMENTS 6,947,296 B2 * 9/2005 Hirosawa ..................... 363/20
2007/0279142 A1 12/2007 Forsyth et al.

FOREIGN PATENT DOCUMENTS

| EP | 0 757 428 | 2/1997 |
| EP | 1 124 317 | 8/2001 |
| GB | 2 130 823 | 6/1984 |
| WO | WO93/19515 | 9/1993 |
| WO | WO01/22563 | 3/2001 |

OTHER PUBLICATIONS

Search Report for PCT/EP2006/005871.
Written Opinion for PCT/EP2006/005871.
Written Decision of the Bundespatentgericht, issued in counterpart DE Application No. 10 2005 028 402.7-32, dated Sep. 13, 2010.

* cited by examiner

CONTROL ARRANGEMENT AND CIRCUIT ARRANGEMENT FOR CONVERTING A DC VOLTAGE INTO A RECTIFIED VOLTAGE

TECHNICAL FIELD

This application relates to a control arrangement for operating a circuit arrangment for converting a DC voltage into a rectified voltage, and a circuit arrangment of this type.

BACKGROUND

Circuit arrangements for converting a DC voltage into a rectified voltage are used in a range of electronic fields such as mobile communications technology and industrial electronics. A circuit arrangement of this type can be designed to generate a rectified voltage that is smaller than the supplied DC voltage. Circuit arrangements of this type can, however, also be used to generate a rectified voltage that is larger than the input DC voltage.

Usual circuit arrangements of this type first convert the supplied DC voltage into an alternating voltage which is subsequently converted bask to a rectified voltage.

Disadvantages of these circuits are that energy losses are involved with the voltage conversion, and the rectified voltage cannot be controlled accurately.

SUMMARY

Described herein is a control arrangement for operating a circuit arrangement for converting a DC voltage into a rectified voltage and a circuit arrangement of this type that permits cost-effective implementation and energy-efficient operation.

In one embodiment, the control arrangement comprises:
- a means of acquiring period and phase information of an oscillation, whose first input is coupled to a first connection of the control arrangement, and whose second input is coupled to a second connection of the control arrangement, which are used to connect to an oscillating circuit,
- a control circuit, a first input of which is coupled to an output of the means of acquiring period and phase information and a second input of which is coupled to a third connection of the control arrangement for the supply of a voltage that is derived from a rectified voltage,
- a switch having a controlled segment that couples a fourth connection of the control arrangement to a reference potential connection, and having a control connection that is connected with an output of the control circuit to initiate an oscillation in the oscillating circuit by means of the DC voltage.

The control arrangement comprises the means for acquiring period and phase information for the oscillation. For this purpose, the two inputs of the means for acquiring period and phase information are coupled to two connections of the control arrangement that serve to connect an oscillating circuit.

The control arrangement further comprises the control circuit whose input side is connected to the output of the means for acquiring period and phase information and with the third connection of the control arrangement. The third connection of the control arrangement serves to supply a voltage that can be derived from the rectified voltage through the provision of feedback. Thus a control loop is formed.

The control arrangement also comprises the switch that joins the fourth connection of the control arrangement to the reference potential connection. The control connection of the switch is connected to the output of the control circuit. The switch is used to excite the oscillation in the oscillating circuit that can be connected to the control arrangement.

The control circuit is used to operate the switch in such a way that a current from a DC voltage input to which the DC voltage is applied can flow through the oscillating circuit and through the controlled segment to the reference potential connection. The current serves to excite the oscillation of the oscillating circuit. The means of acquiring period and phase information of an oscillation makes a signal available to the control circuit, so that the control circuit can periodically change the switch between open and closed states at an appropriate time within an oscillation period.

An advantage of the control arrangement is that, as a result of the acquisition of period and phase information for the oscillation, the excitation of the oscillation can be performed at a time that permits the arrangement to operate with high efficiency.

In a preferred further development, the means of acquiring period and phase information comprises a comparator.

In a preferred embodiment the control arrangement includes an analog/digital converter that is used to acquire the magnitude of the rectified voltage.

In a further development the switch is implemented as a semiconductor switch. The switch can comprise a bipolar transistor. In a preferred embodiment the switch comprises a field-effect transistor.

The transistor can be a junction field-effect transistor. In a preferred embodiment the transistor is a metal oxide-semiconductor field-effect transistor.

The transistor can be a p-channel field-effect transistor. In a preferred embodiment the transistor is an n-channel field-effect transistor.

It is therefore particularly preferred if the transistor is implemented as an n-channel metal oxide-semiconductor field-effect transistor.

The control circuit can be a microcontroller. In a preferred embodiment the control circuit can comprise a digital circuit and an analog circuit, as this can be implemented in a smaller area and with greater economy.

The voltage of the oscillation can have a sinusoidal waveform. In a preferred embodiment the control circuit is designed in such a way that the switch is switched to an open state when the voltage of the oscillation in the oscillating circuit reaches a minimum at the vertex of the lower half-wave. In this case, it is preferred for the control circuit to be designed in such a way that the switch is switched into an open state at a phase angle of 270°, or at $1.5*\pi$, on the sinusoidal waveform.

In a preferred embodiment the control circuit can be set up to periodically hold the switch in the closed state for a duration that depends on the magnitude of the rectified voltage. The circuit arrangement can be designed so that the duration for which the switch is in the closed state is controlled in such a way that the duration is longer when the rectified voltage falls below a specified voltage value, and that the duration is shorter if the rectified voltage exceeds the specified voltage value.

In a further development the control circuit comprises a signal input where information about the specified value for the rectified voltage is supplied. A pulse duty cycle, derived from the relationship between the duration of the closed state of the switch to the period of the oscillation, can be controlled according to the specified value.

The means for acquiring period and phase information, the control circuit and the analog/digital converter can be powered by connecting them to the reference potential connection and to a further connection for the provision of a supply voltage.

In another embodiment the further connection can be the DC voltage connection.

The control arrangement can be implemented on one semiconductor body. The control arrangement can be implemented by means of a complementary metal oxide semiconductor integration technology, abbreviated CMOS integration technology. Favourably the control arrangement can be implemented in high-voltage CMOS integration technology.

A circuit arrangement can comprise the control arrangement as well as an oscillating circuit, whose first and second connections are coupled to the first and second connections of the control arrangement.

The oscillating circuit can comprise a series connection of a capacitor and an inductor. In a preferred embodiment the oscillating circuit comprises a parallel connection of the capacitor and the inductor.

In one embodiment the oscillating circuit is connected at the first connection to the reference potential connection and at the second connection via the controlled segment of the switch to the DC voltage connection.

In a preferred embodiment the oscillating circuit is coupled at the first connection to the DC voltage connection and at the second connection via the controlled segment of the switch to the reference potential connection.

In a preferred embodiment the circuit arrangement comprises a transformer. Its primary side is connected to the oscillating circuit. The primary side of the transformer comprises the first inductor of the oscillating circuit. The secondary side of the transformer comprises a second inductor.

The circuit arrangement can, moreover, comprises a rectifier coupled to the further inductor. The rectifier is designed to rectify the alternating voltage present at the secondary side of the transformer and to provide the rectified voltage at two taps.

The rectifier can be a bridge rectifier or a centre-tapped circuit. In another embodiment the rectifier is a half-wave rectifier.

One tap of the rectifier can be connected to the reference potential connection. A voltage divider incorporating a series circuit comprising two resistors can connect another tap from the rectifier circuit to the reference potential connection. A node of the series circuit located between the two resistors in the series circuit can serve to provide a voltage derived from the rectified voltage. The node of the series circuit can be connected to a fourth input to the control arrangement.

The second inductor can have a smaller number of turns than the first inductor, causing the circuit arrangement to generate a rectified voltage that is smaller than the DC voltage.

In a preferred embodiment the second inductor has a larger number of turns than the first inductor, as a result of which the circuit arrangement is designed to generate a rectified voltage that is larger than the DC voltage.

In one embodiment a suitable selection of the transformer's conversion ratio permits a rectified voltage of between 1 and 5 kV to be achieved.

In one embodiment the frequency of the oscillation can be between 30 kHz and 50 kHz.

Other further developments of the arrangement are discussed in the dependent claims.

Summarizing, the proposed principle offers these advantages:

The transformer and the entire arrangement incorporate only two inductors, i.e. two coils.

The arrangement can be implemented by means of a high-voltage complementary metal oxide semiconductor process, abbreviated to high-voltage CMOS process.

The oscillating circuit is located on the primary side of the transformer, which means that the length of the period and the phase information can be accessed easily.

The rectified voltage can be controlled digitally.

The function of the circuit does not depend on a particular quality of a supplied oscillator frequency.

A power transistor is not required.

An embodiment is described in more detail below with reference to figures.

DETAILED DESCRIPTION

Figure 1:
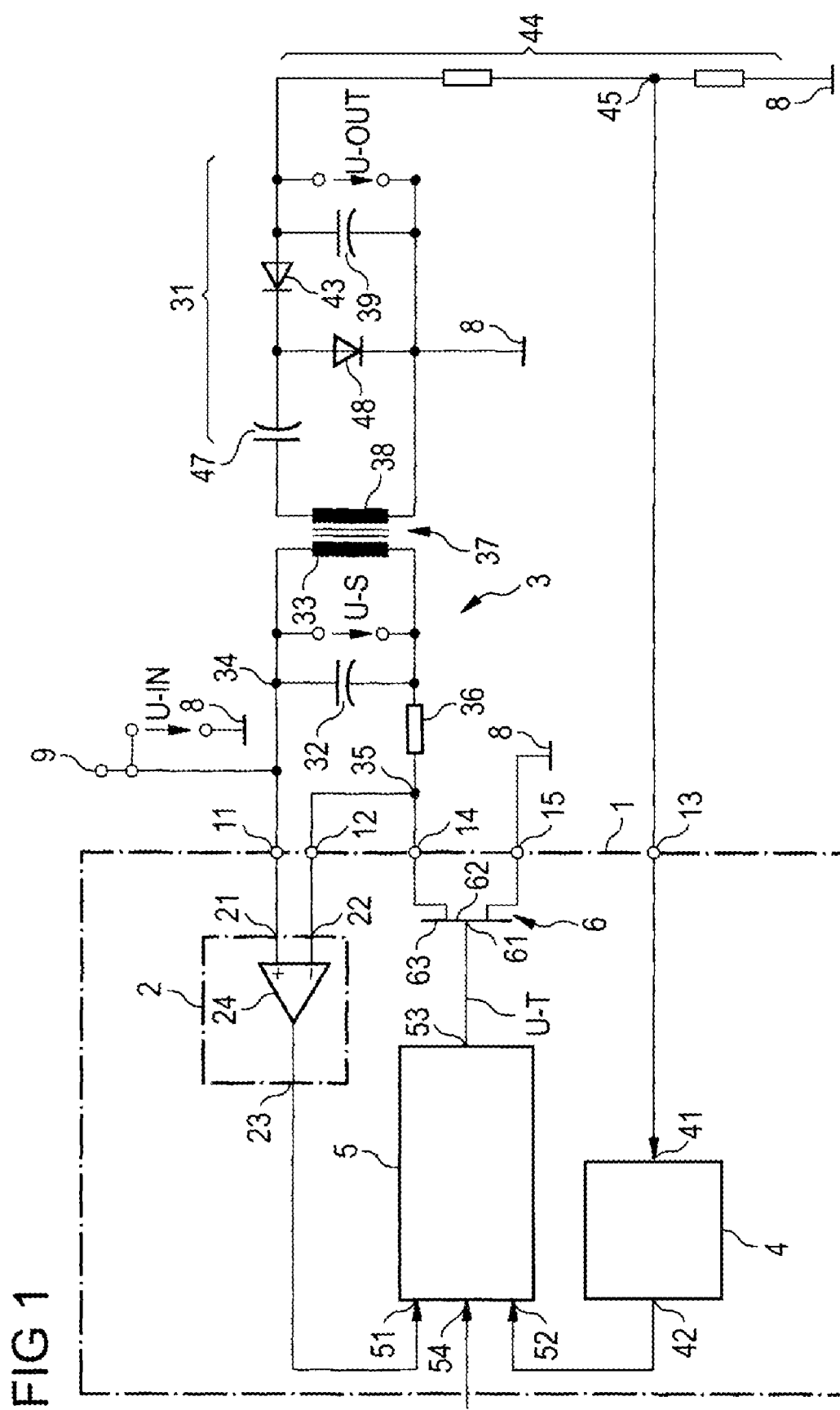
FIG. 1 shows an example of a circuit arrangement for converting a DC voltage into a rectified voltage according to the proposed principle.

FIG. 1 illustrates an example of an implementation of the control arrangement for operating a circuit arrangement for converting a DC voltage U-IN into a rectified voltage U-OUT according to the proposed principle with the aid of a circuit diagram.

A control circuit 5 is connected at one output 53 to an input 61 of a switch 6 that incorporates a control segment 62. The controlled segment 62 connects a fourth connection 14 of the control arrangement 1 to a fifth connection 15 of the control arrangement 1. The fifth connection 15 of the control arrangement 1 is connected to a reference potential connection 8. A first input 51 of the control circuit 5 is connected to an output 23 of the means of acquiring period and phase information 2.

The means of acquiring period and phase information 2 is, in this implementation, a comparator 24; it can, however, consist of measuring equipment of a different type that provides a digital measurement signal with the information about the period and the phase at its output.

A second input 52 of the control circuit 5 is coupled to a third input 13 of the control arrangement 1. The coupling can comprise an analog/digital converter 4.

A control input 54 of the control circuit 5 can be a reset input. The control input 54 can also act to supply start information to the control circuit 5. The start information can comprise a specified value for the rectified voltage U-OUT.

The means for acquiring period and phase information has first and second inputs 21, 22 that are coupled to the first and second connections 11, 12 of the control arrangement 1. The first and second connections 11, 12 of the control arrangement 1 serve to connect an oscillating circuit 3. The oscillating circuit 3 comprises, in this implementation, a capacitor 32 and a first inductor 33 that are connected in parallel, and a resistor 36 connected in series with the parallel circuit of the capacitor 32 and the first inductor 33. The first connection 34 of the oscillating circuit is connected to the first connection 11 of the control arrangement 1, as well as to a DC voltage connection 9. The DC voltage U-IN is connected to the DC connection 9. The second connection 35 of the oscillating circuit 3 is connected to the second and fourth connections 12, 14 of the control arrangement 1.

The first inductor 33 constitutes the primary side of a transformer 37. A second inductor 38 is on the secondary side of the transformer 37. A rectifier 31 is connected to the second inductor 38. A first connection of the second inductor 38 is connected to a first connection of a capacitor 47. A second connection of the capacitor 47 is connected to a positive side of the diode 48. The negative side of the diode 48 is connected to a second connection of the second inductor 38 as well as to the reference potential connection 8. The second connection of the capacitor 47 is also connected to a negative connection of a diode 43. The positive connection of the diode 43 is connected to a first connection of a capacitor 39 and to a first tap of the rectifier 31. A second connection of the capacitor 39 is connected to a second tap of the rectifier 31 and to the negative connection of the diode 48.

The rectified voltage U-OUT can be provided between the first and second taps of the rectifier 31. The first connection to capacitor 39 is connected via a voltage divider to the reference potential connection 8. The voltage divider 44 comprises two resistors. A node 45 between the two resistors is coupled to the third connection 13 of the control arrangement 1. A signal that is derived from the rectified voltage U-OUT can be accessed at the node 45 of the voltage divider 44. The two resistors of the voltage divider 44 are favourably of high resistance.

If the controlled segment 62 of the switch 6 is switched to a conductive state by the signal provided by the control circuit 5, a current flows from the DC voltage connection 9 through the oscillating circuit 3 via the controlled segment 42 to the reference potential connection B. The current charges the capacitor 32. The rise in current results in an increasing magnetic field in the first inductor 33 of the transformer 37, so generating a current in the second inductor 38.

If the controlled segment 63 of the control circuit 5 is switched into an open state, current will no longer flow through the Controlled segment 62. The oscillating circuit 3, however, still has energy stored in the capacitor 32 and in the coil 33, so causing oscillation. In the course of this oscillation, energy is periodically transferred from the capacitor 32 into the coil 33 and back again. Because of the changing current in the first inductor 33, a changing magnetic field is generated in the transformer 37, and this results in a periodically changing current in the second inductor 38. This periodically changing current is converted by the rectifier circuit 31 into a rectified voltage U-OUT. In the embodiment illustrated, the rectified voltage U-OUT is a negative voltage. In a different embodiment, a positive voltage can be generated by inverting the forward directions of the diodes 43, 48.

Information regarding the magnitude of the rectified voltage U-OUT is fed back to the control arrangement 1. A tap from the rectifier circuit 31 is connected via a high-resistance series circuit 44 to the reference potential connection 8 for this purpose. The information about the magnitude of the rectified voltage U-OUT is passed to the control arrangement 1, and in the control arrangement 1 to the control circuit 5.

In a preferred embodiment the signal derived from the rectified voltage U-OUT is converted to a digital signal by means of an analog/digital converter 4.

The means of acquiring period and phase information 2 is used to supply the control circuit 5 with information about the duration of the period, or the frequency respectively of the oscillation in oscillating circuit 3, and about the phase. On the basis of this information, the control circuit 5 is able to switch the switch 6 into a closed state at a suitable time and into an open state at another suitable time. The oscillations in the oscillating circuit 3 are excited by choosing suitable times for the periodic switching into an open state and into a closed state. The switch 6 is favourably only closed when current should flow into the oscillating circuit 3 in order to excite the oscillation.

Figure 2:
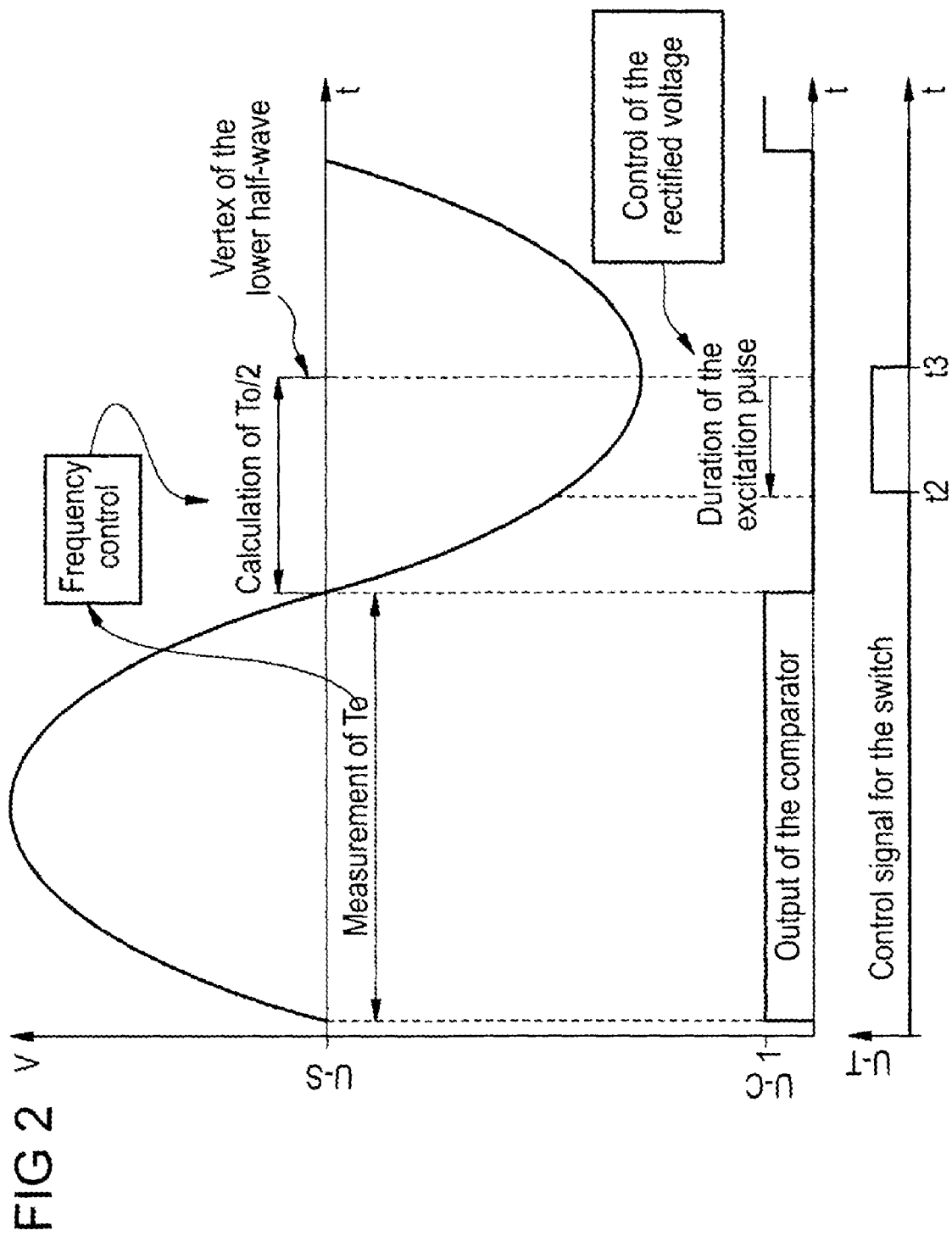
FIG. 2 shows typical signal waveforms for the circuit arrangement according to the proposed principle.

FIG. 2 illustrates signal waveforms plotted against time t in a control arrangement constructed according to the proposed principle.

The voltage U-S between the two connections of the capacitor 32 in the oscillating circuit 3 is plotted on the y-axis. Underneath this, FIG. 2 shows a signal U-C that is present at the output 23 of comparator 24 plotted against time t.

During the first half-wave the signal is at logical value 1, and is at logical value 0 during the second half-wave. This makes the zero-crossings of the oscillating voltage clearly visible, and the length of the period and the frequency can be determined.

At the lower edge of the diagram, FIG. 2 shows a signal U-T, representing the control signal present at the switch 6. The control circuit 5 provides the signal U-T at the output 53. The switch 6 is, in this implementation, open when the voltage of the oscillation reaches a minimum. This is the case when the phase is 270°, i.e. 1.5*π.

The switch 6 is closed at a point of time t2 and opened at point of time t3, wherein the difference between t2 and t3 represents the duration of one pulse. This pulse duration is a function of the obtained value of the rectified voltage U-OUT. If the obtained value of the rectified voltage U-OUT is lower than a specified value, the pulse duration is increased. Conversely, the pulse duration is shortened if the rectified voltage U-OUT is higher than the specified value. Dividing the pulse duration by the period length 2*To yields a duty factor.

In one embodiment the control circuit 5 is designed to measure the length of the period, and to determine the point of time t2 and t3 from the specified value for the rectified voltage and the present value of the rectified voltage. The excitation of the oscillation is thereby energy-efficient.

The invention claimed is:

1. Circuitry for operating a circuit arrangement for converting a DC voltage to a rectified voltage, the circuitry comprising:
   an oscillating circuit comprising a capacitor and an inductor, the capacitor and the inductor being electrically coupled in parallel, the oscillating circuit for transferring energy between the capacitor and the inductor;
   an acquiring circuit to acquire period and phase information of an oscillation, the acquiring circuit comprising a first input electrically coupled to a first connection and a second input electrically coupled to a second connection, the first connection and the second connection for electrically coupling to the oscillating circuit;
   a control circuit comprising a first input electrically coupled to an output of the acquiring circuit, the control circuit further comprising a second input electrically coupled to a third connection for supply of a voltage that is based on the rectified voltage; and
   a switch comprising a controlled segment, the controlled segment for electrically coupling a fourth connection to a reference potential connection, the switch further comprising a control connection that is electrically coupled to an output of the control circuit to excite an oscillation in the oscillating circuit via the DC voltage.

2. The circuitry of claim 1, wherein the acquiring circuit comprises a comparator, the comparator comprising:
   a non-inverting input comprising the first input of the acquiring circuit;
   an inverting input comprising the second input of the acquiring circuit;

an output comprising the output of the acquiring circuit to output a signal that is based on a difference between a signal at the non-inverting input and a signal at the inverting input.

3. The circuitry of claim 1, further comprising an analog/digital converter, the analog/digital converter comprising an input electrically coupled to the third connection and an output electrically coupled to the second input of the control circuit.

4. The circuitry of claim 1, wherein the switch comprises a transistor, the transistor comprising a control input that comprises the control connection of the switch, and the transistor comprising a controlled segment comprising the controlled segment of the switch.

5. The circuitry of claim 4, wherein the transistor comprises a field-effect transistor.

6. The circuitry of claim 4, wherein the transistor comprises a metal oxide-semiconductor field-effect transistor.

7. The circuitry of claim 4, wherein the transistor comprises an n-channel metal oxide-semiconductor field-effect transistor.

8. The circuitry of claim 1, wherein the control circuit is configured to switch the switch periodically into an open state when a half-wave of the oscillation is at a minimum.

9. The circuitry of claim 1, wherein the control circuit is configured to switch the switch periodically into a closed state for an adjustable duration of a pulse, and wherein the control circuit is configured to set the adjustable duration of the pulse in accordance with a value of the rectified voltage.

10. The circuitry of claim 1,
wherein the oscillating circuit comprises first and second connections;
wherein the first connection of the oscillating circuit is electrically coupled to the first connection of the circuitry and to a DC voltage connection; and
wherein the second connection of the oscillating circuit is electrically coupled to the second connection of the circuitry and to the fourth connection of the circuitry.

11. The circuitry of claim 1, wherein the oscillating circuit comprises a resistor that is electrically coupled in series to the parallel electrical connection of the capacitor and the inductor.

12. The circuitry of claim 10, further comprising:
a transformer electrically coupled to the oscillating circuit;
wherein the inductor comprises a primary side of the transformer and a secondary side of the transformer comprises a second inductor.

13. The circuitry of claim 12, further comprising:
a rectifier that is electrically coupled to the second inductor.

14. The circuitry of claim 13, wherein the rectifier comprises at least one capacitor and at least one diode.

15. The circuitry of claim 13, wherein the rectifier comprises two taps for delivering the rectified voltage.

16. The circuitry of claim 15, further comprising:
a voltage divider that electrically couples one of the taps of the rectifier to the reference potential connection so that a voltage derived from the rectified voltage is at a tap of the voltage divider.

17. The circuitry of claim 9,
wherein the oscillating circuit comprises first and second connections;
wherein the first connection of the oscillating circuit is electrically coupled to the first connection of the circuitry and to a DC voltage connection; and
wherein the second connection of the oscillating circuit is electrically coupled to the second connection of the circuitry and to the fourth connection of the circuitry.

18. Circuitry for operating a circuit arrangement for converting a DC voltage to a rectified voltage, the circuitry comprising:
an oscillating circuit comprising a capacitor and an inductor, the capacitor and the inductor being electrically coupled in parallel;
a resistor in series with the capacitor and the inductor;
an acquiring circuit to acquire period and phase information of an oscillation, the acquiring circuit comprising a first input electrically coupled to a first connection and a second input electrically coupled to a second connection, the first connection and the second connection for electrically coupling to the oscillating circuit;
a control circuit comprising a first input electrically coupled to an output of the acquiring circuit, the control circuit further comprising a second input electrically coupled to a third connection for supply of a voltage that is based on the rectified voltage; and
a switch comprising a controlled segment, the controlled segment for electrically coupling a fourth connection to a reference potential connection, the switch further comprising a control connection that is electrically coupled to an output of the control circuit to excite an oscillation in the oscillating circuit via the DC voltage.

19. Circuitry for operating a circuit arrangement for converting a DC voltage to a rectified voltage, the circuitry comprising:
an acquiring circuit to acquire period and phase information of an oscillation, the acquiring circuit comprising a first input electrically coupled to a first connection and a second input electrically coupled to a second connection, the first connection and the second connection for electrically coupling to an oscillating circuit;
a control circuit comprising a first input electrically coupled to an output of the acquiring circuit, the control circuit further comprising a second input electrically coupled to a third connection for supply of a voltage that is based on the rectified voltage; and
a switch comprising a controlled segment, the controlled segment for electrically coupling a fourth connection to a reference potential connection, the switch further comprising a control connection that is electrically coupled to an output of the control circuit to excite an oscillation in the oscillating circuit via the DC voltage;
wherein the control circuit is configured to switch the switch periodically into an open state when a half-wave of the oscillation is at a minimum;
wherein the control circuit is configured to switch the switch periodically into a closed state for an adjustable duration of a pulse; and
wherein the control circuit is configured to set the adjustable duration of the pulse in accordance with a value of the rectified voltage.

* * * * *

UNITED STATES PATENT AND TRADEMARK OFFICE
CERTIFICATE OF CORRECTION

| | | |
|---|---|---|
| PATENT NO. | : 8,035,997 B2 | Page 1 of 1 |
| APPLICATION NO. | : 11/993291 | |
| DATED | : October 11, 2011 | |
| INVENTOR(S) | : Andreas Fitzi | |

It is certified that error appears in the above-identified patent and that said Letters Patent is hereby corrected as shown below:

Column 7, Claim 11, Line 40
In Claim 11, Delete "to the" and Insert -- to a --

Signed and Sealed this
Sixth Day of March, 2012

David J. Kappos
*Director of the United States Patent and Trademark Office*